United States Patent
Oswald et al.

(10) Patent No.: US 6,277,900 B1
(45) Date of Patent: Aug. 21, 2001

(54) WELL CEMENTING AIDS

(75) Inventors: Reinhard Oswald, Vienna (AT); Volker Frenz, Mainz-Kostheim (DE); Juergen Tonhauser, Oestrich-Winkel (DE); Aranka Tardi, Neuberg (DE); Pierre Maroy, Buc; Florence L'Alloret, Paris, both of (FR)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/196,668

(22) Filed: Nov. 19, 1998

(30) Foreign Application Priority Data

Nov. 25, 1997 (DE) .............................. 197 52 093

(51) Int. Cl.$^7$ ...................................... C09K 7/00

(52) U.S. Cl. ................... 523/130; 524/3; 524/4; 524/5; 524/555; 524/556; 524/560; 524/566; 526/287; 526/288

(58) Field of Search ................ 523/130; 524/3, 524/4, 5, 555, 556, 560, 566; 526/287, 288

(56) References Cited

U.S. PATENT DOCUMENTS

| | | |
|---|---|---|
| 2,614,998 | 10/1952 | Lea . |
| 2,865,876 | 12/1958 | Scott . |
| 2,905,565 | 9/1959 | Dietz et al. . |
| 3,052,628 | 9/1962 | Stanberry, Jr. et al. . |
| 3,898,037 * | 8/1975 | Lange et al. ............ 21/2.7 R |
| 4,015,991 | 4/1977 | Persinski et al. . |
| 4,342,653 * | 8/1982 | Halverson ................ 210/734 |
| 4,515,635 | 5/1985 | Rao et al. . |
| 4,555,269 | 11/1985 | Rao et al. . |
| 4,587,283 | 5/1986 | Hille et al. . |
| 4,640,942 | 2/1987 | Brothers . |
| 4,931,489 | 6/1990 | Kucera et al. . |
| 4,963,632 * | 10/1990 | Bock et al. ............ 526/240 |
| 5,025,040 | 6/1991 | Crema et al. . |
| 5,294,651 | 3/1994 | Stephens . |
| 5,447,986 * | 9/1995 | Fox et al. ............ 524/555 |
| 5,472,051 | 12/1995 | Brothers . |
| 5,733,992 * | 3/1998 | Relvini et al. ............ 526/201 |

FOREIGN PATENT DOCUMENTS

| | | |
|---|---|---|
| 3302168 | 7/1984 | (DE) . |
| 0116671 | 8/1984 | (EP) . |
| 0157055 | 10/1985 | (EP) . |
| 0217608 | 4/1987 | (EP) . |

* cited by examiner

Primary Examiner—Edward J. Cain
(74) Attorney, Agent, or Firm—Susan S. JJackson; Scott E. Hanf

(57) ABSTRACT

The present invention relates to copolymers consisting of (a) 1–99% by weight of structural units of the formula (1)

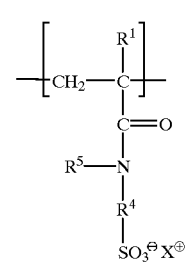

(1)

where $R^1$ is hydrogen or methyl, $R^4$ is $C_1$–$C_{22}$-alkylene, $R^5$ is $C_1$–$C_{22}$-alkyl or hydrogen, and X is ammonium, lithium, sodium, potassium, an amine or a mixture of these substances, and (b) 99–1% by weight of structural units of the formula (2)

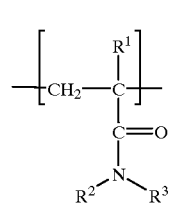

(2)

where $R^1$ is hydrogen or methyl, $R^2$ and $R^3$, independently of one another, are hydrogen, or $C_2$–$C_{22}$-alkyl, wherein component b) is not hydrolysed and the copolymers have been prepared by a solution precipitation polymerization in a nonaqueous solvent or a water-miscible, organic solvent having a low water content which is a precipitant for the copolymer. The invention furthermore relates to a process for cementing subterranean wells using a cement slurry comprising the following components:

a) water of various salinity cement a novel copolymer in a concentration of 0.01–5% bwoc, preferably from 0.05 to 0.9% bwoc.

14 Claims, No Drawings

WELL CEMENTING AIDS

FIELD OF THE INVENTION

The present invention relates to water-soluble copolymers, process for their preparation, and their use for reducing water loss in cement slurries for cementing subterranean wells.

BACKGROUND OF THE INVENTION

In subterranean wells for recovering oil and natural gas deposits, the use of drilling fluids and cement slurries has been known for some time. When the borehole has reached a certain depth, a casing is introduced into the hole. For this purpose, the casing must be secured, i.e. a cement slurry is pumped into the space between the formation and the casing and sets to form a solid rock. The hardened cement must be impermeable to gases and liquids in order that no gas and/or oil can flow out of the carrier rock into other sections or as far as the surface. The cement slurry to be pumped is subject to high demands. It should be readily pumpable, i.e. of the lowest possible viscosity, and nevertheless should not separate out. The release of water by the cement slurry to the porous rock should be low during the pumping operation, in order that thick filter cakes do not form at the borehole wall; thick filter cakes would increase the pumping pressure so much, owing to the annular space constriction, that the porous rock would disintegrate. In addition, the cement slurry would not set properly and would become permeable to gas and oil if the release of water were excessive. On the other hand, the cement jacket forming must reach a certain strength as rapidly as possible in the annular space, and shrinkage must not occur during setting, as this would result in flow channels for gas, oil and water. Optimum setting of the properties of the cement slurry is only possible through additives. The most important additives are retardants, accelerators, dispersants and water-loss reducers.

Effective water-loss reducers used in practice in cement and gypsum slurries are a wide variety of polymers, copolymers and combinations thereof. The first effective products, which are still used today, were cellulose ethers based on hydroxyethylcellulose and carboxymethylhydroxyethylcellulose. Owing to thermal instability, these lose their efficiency at borehole temperatures above 100° C. (212° F.). As a consequence, many different fully synthetic heat-stabilized polymers have been developed and are still in use today at the various temperatures and salinities of the cement slurry.

Polymers as additives for reducing water loss in cement slurries are well known from the literature. Many water-loss reducers have greatly restricted activity at high temperatures.

U.S. Pat. No. 2,614,998 describes the use of partially hydrolyzed polyacrylamide (poly(acrylamide-co-acrylic acid) as water-loss-reducing polymers. However, these polymers can result in considerable retardation of the cement setting time and have only low effectiveness at high temperatures.

U.S. Pat. No. 2,865,876, U.S. Pat. No. 2,905,565 and U.S. Pat. No. 3,052,628 describe the use of sulfonated polymers as additives. The polymers and copolymers described therein differ significantly in their composition from the copolymers according to the present invention and have achieved absolutely no industrial importance.

U.S. Pat. No. 5,472,051 describes copolymers of AMPS and acrylic acid having molecular weights of less than 5000 g/mol.

U.S. Pat. No. 4,015,991 describes a polymer of AMPS and acrylamide, where at least 20% of the acrylamide units must subsequently be hydrolyzed to acrylic acid or a salt of acrylic acid. The claimed polymer consists of AMPS, acrylamide and acrylic acid or a salt of acrylic acid. U.S. Pat. No. 4,015,991 thus claims the following copolymer:

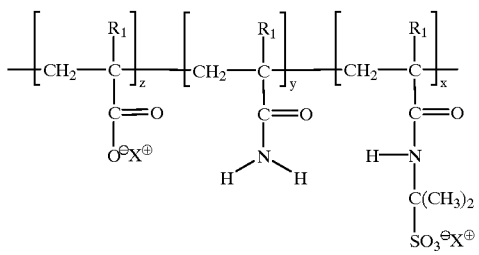

where x is 10–90 mole percent
y is 10–90 mole percent
z, depending on y, is 2–90 mole percent,
where, if z is 0, inadequate water-loss-reducing properties were found in the test carried out. However, the disadvantage of this polymer is an undesired effect on the cement properties (reduction in the strength of the set cement) and retardation of cement setting. A further problem is the restricted temperature range for use as water-loss-reducing polymer. At 350° F., it is demonstrably inactive. U.S. Pat. No. 4,015,991 showed that suitable copolymers cannot be prepared by aqueous polymerization of AMPS and acrylamide without a hydrolysis step.

EP 0 116 671 (=DE 3302168) discloses the introduction of 5–60% by weight of a further, new comonomer, namely a vinylamide (for example N-vinylmethylacetamide). This allows the high-temperature application range to be significantly broadened, but these polymers exhibit worse applicational properties at temperatures below about 38° C. (100° F.).

U.S. Pat. No. 5,025,040 describes copolymers of AMPS, acrylamide and at least 20% of N-vinylimidazole as new vinylamide components.

U.S. Pat. No. 4,931,489 discloses copolymers of substituted acrylamides and N-vinylimidazoles without the use of AMPS as comonomer.

EP-A-0 217 608, U.S. Pat. No. 4,555,269 and EP-A-0 157 055 describe a copolymer of AMPS and dimethylacrylamide in a molar ratio of from 1:4 to 4:1 as fluid-loss additive for cement slurries containing salts (approximately 10% by weight) and the use of AMPS and acrylic acid in a molar ratio of from 1:4 to 4:1 for the same purpose.

According to U.S. Pat. No. 5,294,651, the disadvantages of the process of U.S. Pat. No. 4,015,991 are overcome by an improvement analogous to EP-A-0 116 671 by using a further comonomer, in this case a cyclic vinylamide (for example N-vinylpyrrolidone). The proposed solution does not differ significantly from the method indicated in EP-A-0 116671.

A technically satisfactory solution for a temperature range of from 4 to 205° C. (39 to 400° F.) based on the monomers disclosed in US-4,015,991 or without partial hydrolysis of the acrylamide has hitherto not been described.

The multiplicity of polymers developed in order to reduce the release of water makes it clear that it is always difficult to formulate a technically optimum cement slurry. A significant effect on its suitability is exerted by the temperature of the borehole section prepared for cementing. The polymers designed for different temperatures represent considerable logistical problems, since a certain stock of a number of water-loss-reducing polymers must always be maintained at locations scattered throughout the world. The object was therefore to develop polymers which can cover the entire temperature range (4° C.–205° C.) and are suitable for a wide range of cement slurries, i.e. various cement qualities, mixing water salinities and cement slurry densities.

Surprisingly, it has been found that the technical properties required can be achieved by an AMPS-acrylamide copolymer if the polymerization process is modified and the subsequent hydrolysis is omitted, giving a novel polymer which has not been described before. In addition, this polymer does not cause setting retardation at below 40° C.

SUMMARY OF THE INVENTION

The present invention relates to copolymers consisting of
(a) 1–99% by weight of structural units of the formula (1)

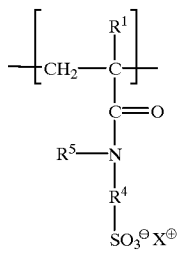

(1)

where $R^1$ is hydrogen or methyl, $R^4$ is $C_1$–$C_{22}$-alkylene, $R^5$ is $C_1$–$C_{22}$-alkyl or hydrogen, and X is ammonium, lithium, sodium, potassium, an amine or a mixture of these substances, and (b) 99–1% by weight of structural units of the formula (2)

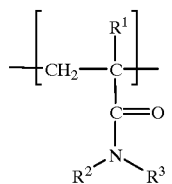

(2)

where $R^1$ is hydrogen or methyl, $R^2$ and $R^3$, independently of one another, are hydrogen, or $C_2$–$C_{22}$-alkyl, wherein component b) is not hydrolyzed and the copolymers have been prepared by a solution precipitation polymerization in a nonaqueous solvent or a water-miscible, organic solvent having a low water content which is a precipitant for the copolymer.

DESCRIPTION OF THE PREFERRED EMBODIMENTS $R^2$ and $R^3$ are preferably hydrogen. $R^4$ is preferably $C_2$–$C_{10}$-alkylene, in particular $C_3$-alkylene. $R^5$ is preferably hydrogen or methyl. In particular, the following substituents are used:

$X^+=NH_4^+$ or $Na^+$,
$R^1$=H, $R^5$=H and $R^4$=—$C(CH_3)_2$—$CH_2$—,
$R^1$=$CH_3$, $R^5$=H and $R^4$=—$C(CH_3)_2$—$CH_2$—,
$R^1$, $R^2$ and $R^3$=H,
$R^1$ and $R^2$=H, $R^3$=—$C(CH_3)_3$,
$R^1$=$CH_3$, $R^2$ and $R^3$=H, or
$R^1$ and $R^2$=H, $R^3$=—$C(CH_3)_3$.

The mean molecular weight of these polymers is preferably from 10,000 to 10,000,000 g/mol, preferably from 500,000 to 5,000,000 g/mol, in particular from 1,000,000 to 4,000,000 g/mol. Indicators of the molecular weight are the relative viscosity and the k value. In order to determine the k value, the copolymer is dissolved to a certain concentration (usually 0.5%), and the efflux time is determined at 25° C. using an Ubbelohde capillary viscometer. This value gives the absolute viscosity of the solution ($\eta_c$) The absolute viscosity of the solvent is $\eta_o$. The ratio between the two absolute viscosities gives the relative viscosity $$z = \frac{\eta_c}{\eta_o}$$

The k value can be determined from the relative viscosities as a function of concentration by means of the following equation:

$$\log z = \left( \frac{75 \cdot k^2}{1 + 1.5\,kc} + k \right) c$$

The amount of structural units of the formula (1) is preferably from 10 to 90% by weight, in particular from 30 to 70% by weight. The amount of structural units of the formula (2) is preferably from 90 to 10% by weight, in particular from 80 to 30% by weight.

Subsequent hydrolysis as described in U.S. Pat. No. 4,015,991 is not advantageous for the technical properties (see Examples 1–7, Tables 1 and 2) in order to allow use as water-loss reducer in the broadest possible temperature range from 4° C. to 205° C. (39° F. to 400° F.). Indeed, it has been found that subsequent partial hydrolysis results in disadvantageous technical properties at low temperatures in the form of extension of the cement setting time, and that, at high temperatures above 120° C. (250° F.), the water loss is difficult to control. The novel polymers can be used as water-loss reducers at between 4° C. and 205° C. in drilling fluids, in particular in cement slurries and water-based drilling muds. Their effectiveness is guaranteed even at 4° C. and 205° C. The polymer can be mixed in the dry state with other pulverulent additives. However, it can also be added in dissolved form, together with other liquid additives, to the mixing water.

The copolymers are prepared by solution precipitation polymerization (see H. G. Elias, Makromoleküle, Struktur-Eigenschaften-Synthese-Stoffe [Macromolecules, Structure-Properties-Synthesis-Materials], Hüthig & Wepf Verlag, 1972, page 487). The monomers are fully or partially soluble in the polymerization medium, while the polymer is insoluble. The reaction can be carried out at temperatures between −10 and 100° C., preferably between 20 and 70° C.

Suitable polymerization initiators are all substances which form free radicals; besides typical diazo compounds and per compounds, initiation by a redox initiator, a photo-initiator or by high-energy radiation (UV, neutrons or plasma) is also possible. The water content of the solvents employed here should preferably not exceed 10%, in particular 5%. In contrast to aqueous free-radical polymerization, the product shows only minor dependence on the nature and quantity of the initiator system used.

Preferred examples of the compounds from which the structural units of the formula 1 are derived are acrylamido-2-methylpropanesulfonic acid and methacrylamido-2- methylpropanesulfonic acid. Preferred examples of the compounds from which the structural units of the formula 2 are derived are acrylamide, methacrylamide, isopropylacrylamide and tert-butylacrylamide.

The polymers are formed as a white, bulky precipitate in tert-butanol. The polymer can be isolated by all conventional evaporation, drying and isolation processes. In particular, the butanol can be separated from the product by pressure filtration or distillation. A slight residue of tert-butanol causes neither safety nor technical problems.

The invention furthermore relates to a process for cementing subterranean wells using a cement slurry containing the novel copolymer in a concentration of 0.01–5% bwoc (by weight of cement), preferably from 0.05 to 0.9% bwoc. Further components of the cement slurries are water of various salinity and cement. In addition, dispersants, retardants, accelerators, extenders, antifoams or silicate derivatives can be used as auxiliary additives.

The invention furthermore relates to the use of the novel copolymers in water-based drilling fluids. These drilling fluids can contain further additives in addition to the novel copolymers. Such additives are, for example, bentonites, clay stabilizers, lignin/lignosulfonates, pH stabilizers (for example hydroxides), heat stabilizers (for example monoethanolamine or sulfonated synthetic polymers) and barytes (in order to set the desired density).

The examples below describe the practice of the invention in greater detail.

EXAMPLES

The first four examples describe typical processes for the preparation of the novel polymer. In the examples, the counterion and the copolymer composition were varied. In the first four examples, analytical and spectroscopic efforts did not detect any significant amounts of acrylic acid or acrylates (hydrolysis products of acrylamide). As expected, hydrolysis of acrylamide did not occur at these temperatures and pH values (see also Example 7). The technical effect is therefore attributable to poly(AMPS-co-acrylamide).

EXAMPLE 1
Copolymer Comprising 70% by Weight of AMPS and 30% by Weight of AM, Ammonium Salt A 3 liter Quickfit flask fitted with anchor stirrer, reflux condenser with offgas scrubber, combined thermometer/pH meter and gas-inlet tube is charged with 1700 g of a rectified tert-butanol and 50 ml of distilled water. The reaction flask is placed in a thermostated heating bath. This reaction flask is blanketed with nitrogen gas, and 245 g of acrylamido-2-methylpropanesulfonic acid (AMPS 2404® (registered trademark of Lubrizol)) are introduced under a gentle counterstream of nitrogen. The AMPS does not dissolve completely in the tert-butanol and is partly in the form of a solids dispersion. The pH of this mixture is below 1. Gaseous ammonia is passed in above the liquid phase through the gas-inlet tube until the pH of the dispersion is between 7 and 8. After the desired pH range has been reached, the mixture is stirred for a further hour and the pH is recorded continuously. The reaction flask is again blanketed with nitrogen, and 105 g of acrylamide are introduced. After introduction of acrylamide, the pH is re-checked and if necessary corrected to the range pH 7–8. A constant stream of nitrogen is passed through the solution for at least 1 hour. After this inertization time, the residual oxygen content is checked by means of an oxygen electrode. If the measured residual oxygen value in the liquid phase exceeds 1 ppm, the inertization must be repeated until this value is achieved. 1.5 g of AIBN are then added under a gentle stream of nitrogen, and the reaction flask is warmed to 60° C. Shortly after an internal temperature of 60° C. has been reached, the introduction of nitrogen gas is terminated and the polymerization reaction typically starts after a few minutes, which is evident from a 10–15° C. increase in temperature. Approximately 30 minutes after commencement of the polymerization reaction, the temperature maximum is passed and the temperature in the reaction flask is raised to the boiling point of the tert-butanol by means of the heating bath. The mixture, which is now viscous, is stirred for a further two hours under gentle reflux.

The reaction product, which is in the form of a viscous suspension of polymer in tert.-butanol, is isolated by filtering off the tert-butanol followed by drying in a vacuum drying cabinet.

Yield: 365 g of polymer 1
Ammonium salt of poly(acrylamido-2-methylpropanesulfonic acid-co-acrylamide)
Dry content: 96% by weight (2.5% of tert-butanol, 1.5% of water)
k value of a 0.5% by weight solution: 212

EXAMPLE 2
Copolymer Comprising 70% by Weight of AMPS and 30% by Weight of AM, Sodium Salt The polymer is prepared analogously to Example 1. Instead of adding a corresponding amount of ammonia, 140.5 g of sodium carbonate are metered in after the addition of the AMPS. The pH of the dispersion is then in the range between 7 and 8. Yield: 380 g of polymer 2, sodium salt of poly(acrylamido-2-methylpropanesulfonic acid-co-acrylamide)
Dry content: 94% by weight
k value of a 0.5% by weight solution: 207

EXAMPLE 3
Copolymer Comprising 60% by Weight of AMPS and 40% by Weight of AM, Ammonium Salt The polymer is prepared analogously to Example 1. Instead of the amounts given in Example 1, 210 g of AMPS 2404 and 140 g of acrylamide are used.

Yield: 362 g of polymer 3
Ammonium salt of poly(acrylamido-2-methylpropanesulfonic acid-co-acrylamide)
Dry content: 97% by weight (2.5% of tert-butanol, 1.5% of water)
k value of a 0.5% by weight solution: 210

EXAMPLE 4
Copolymer Comprising 80% by Weight of AMPS and 20% by Weight of AM, Ammonium Salt The polymer is prepared analogously to Example 1. Instead of the amounts given in Example 1, 280 g of AMPS 2404 and 70 g of acrylamide are used.

Yield: 368 g of polymer 4
Ammonium salt of poly(acrylamido-2-methylpropanesulfonic acid-co-acrylamide)
Dry content: 94% by weight (2.5% of tert-butanol, 1.5% of water)
k value of 0.5% by weight solution: 205

Analogously to U.S. Pat. No. 4,015,991, partial hydrolysis of the product was carried out, but with the aim of comparing the technical properties of the product before and after hydrolysis. The technical testing makes it clear that subsequent partial hydrolysis of the product offers no advantages, but makes the process significantly more complex and expensive.

EXAMPLE 5
Controlled Hydrolysis of the Polymer Prepared in Example 1

50 g of polymer 1 are dissolved in 1500 ml of distilled water with stirring. After complete dissolution of the polymer, 6.3 g of potassium hydroxide which had been dissolved beforehand in 20 ml of water are added. The mixture is heated to 60° C. and stirred at this temperature for one hour. The product is dried with the aid of a roller drier. The process hydrolyzes 50% of the acrylamide to acrylic acid.

EXAMPLE 6
Controlled Hydrolysis of the Polymer Prepared in Example 1

50 g of polymer 1 from Example 1 are dissolved in 1500 ml of distilled water with stirring. After complete dissolution of the polymer, 3.8 g of potassium hydroxide which had been dissolved beforehand in 20 ml of water are added. The mixture is heated to 60° C. and stirred at this temperature for one hour. The product is dried with the aid of a roller drier. The process hydrolyzes 30% of the acrylamide to acrylic acid.

EXAMPLE 7
Checking of the Hydrolysis Reaction and Drying Conditions

The polymer is prepared analogously to Example 1, with 50 g of the polymer being dissolved in 1500 ml of distilled water with stirring. The mixture is heated to 60° C. and stirred at this temperature for one hour. The product is dried with the aid of a roller drier. No hydrolysis has taken place.

A further essential factor for successful technical testing is the highest possible molecular weight. Direct measurement of the absolute molecular weight is not easy, since, for example, gel permeation chromatography, like many other methods, is a comparative method based on the use of polymer standards. Such model substances cannot be prepared for these systems by anionic polymerization. For this reason, the relative viscosity was used as a measure of the molecular weight. In the present process, excessively low molecular weights can occur very easily as a result of an impurity. Particularly important impurities here are those which have a high free-radical chain-transfer constant, such as, for example, aldehydes and oximes, but also heavy-metal impurities or oxygen. An impurity of this type is simulated by addition of dodecyl mercaptan, which, as is known, has a relatively large free-radical chain-transfer constant. Such compounds can cause considerable interference with the polymerization even in the ppm range. The examples serve to check for the minimum necessary relative viscosity (lower molecular-weight limit) that gives the desired properties. In Examples 8 and 9, low-molecular-weight polymers of this type were prepared.

In Example 7, the effect of dissolution and subsequent roller drying is investigated. Neither process step results in any change to the novel polymer.

EXAMPLE 8
Copolymer Comprising 70% by Weight of AMPS and 30% by Weight of AM, Ammonium Salt The polymer is prepared analogously to Example 1.

Before addition of the AIBN, 0.035 g of dodecyl mercaptan is added. The product is soluble in butanol and has a high free-radical chain-transfer constant.

Yield: 362 g of polymer 7

Ammonium salt of poly(acrylamido-2-methylpropanesulfonic acid-co-acrylamide)

Dry content: 95% by weight k value of a 0.5% by weight solution: 169

EXAMPLE 9
Copolymer Comprising 70% by Weight of AMPS and 30% by Weight of AM, Ammonium Salt The polymer is prepared analogously to Example 1.

Before addition of the AIBN, 0.07 g of dodecyl mercaptan is added. The product is soluble in butanol and has a high free-radical chain-transfer constant.

Yield: 369 g of polymer 1

Ammonium salt of poly(acrylamido-2-methylpropanesulfonic acid-co-acrylamide)

Dry content: 93% by weight (2.5% of tert-butanol, 1.5% of water)

k value of a 0.5% by weight solution: 148

The first examples demonstrate that solution precipitation polymerization in organic solvents is a suitable process for the preparation of water-loss-reducing polymers. For comparison with the technical properties of these novel polymers, the compound described in U.S. Pat. No. 4,015,991 was prepared and tested.

COMPARATIVE EXAMPLE 1
(Not According to the Invention, Prepared as Described in U.S. Pat. No. 4,015,991, Copolymer Prepared by Aqueous Gel Polymerization, 88% by Weight of AMPS, 12% by Weight of Acrylamide)

328 g of distilled and degassed water are introduced into a 2 liter Quickfit flask fitted with anchor stirrer, reflux condenser with offgas scrubber, combined thermometer/pH meter and gas-inlet tube, and 116.4 g of acrylamido-2-methylpropanesulfonic acid (AMPS 2404®) are added. The AMPS is neutralized by addition of 45 g of a 50% solution of sodium hydroxide solution (NaOH). The neutralization reaction gives a clear solution having a pH of between 7 and 8. 14.7 g of acrylamide are slowly dissolved in the solution neutralized in this way. Nitrogen gas is again passed through the reaction solution for 1 hour. 0.69 g of tert-butyl peroxypivalate and 1.0 ml of an iron ammoniumsulfate are then added as redox initiator pair. The iron ammoniumsulfate solution is prepared by dissolving 0.098 g of $Fe(NH_4)_2(SO_4)_2$ in 500 g of water. This mixture is further stirred at room temperature until a polymerization reaction commences, after 1–2 hours. The exothermic polymerization reaction increases the temperature to 50–60° C. in the adiabatic polymerization. After the temperature maximum has been passed, the internal temperature is set at 60° C. by the thermostat. A clear, high-viscosity gel forms. The gel is mechanically comminuted and dried on a roller drier.

Yield: 149 g of comparative polymer 1

Sodium salt of poly(acrylamido-2-methylpropanesulfonic acid-co-acrylamide)

According to the testing, this base polymer had an only poor water-loss-reducing action. By contrast, the partially hydrolyzed products should have good technical properties at a low temperature of 28° C. (100° F.). These products were prepared and tested as described in Comparative Examples 2 and 3.

COMPARATIVE EXAMPLE 2
(Not According to the Invention, Prepared as Described in U.S. Pat. No. 4,015,991)
Controlled Hydrolysis of the Polymer Prepared in Comparative Example 1

45.3 g of comparative polymer 1 are dissolved in 1500 ml of distilled water with stirring. After complete dissolution of the polymer, 1.68 g of potassium hydroxide dissolved in 20 ml of water are added. The mixture is heated to 60° C. and stirred at this temperature for one hour. The reaction product is again dried with the aid of a roller drier. This produces 50% hydrolysis of the acrylamide.

COMPARATIVE EXAMPLE 3
(Not According to the Invention, Prepared as Described in U.S. Pat. No. 4,015,991)
Controlled Hydrolysis of the Polymer Prepared in Comparative Example 1

The hydrolysis is carried out analogously to Comparative Example 2. However, a reduced amount of 1.0 g of KOH is used. 30% hydrolysis of the acrylamide is thus achieved.

By means of analytical and spectroscopic methods, acrylic acid functionalities (acrylic acid or salts thereof) in the correct order of magnitude were found.

EXAMPLES

Test Results

The testing is carried out according to API spec. 10. In an atmospheric consistometer, the cement slurry is stirred/conditioned at the test temperature, and the rheology is then measured at the same temperature using a FANN model 35SA viscometer (at high temperature, conditioning is carried out at 93° C. and the viscosity measured) and the water loss is measured at below 120° C. using a Baroid HTHP filter press or at above 120° C. using the stirring fluid loss test apparatus. The setting time is determined using an HTHP consistometer.

Table 1 shows the water-loss-reducing properties in the above examples according to API spec. 10 at 35° C. (95° F.) in the static filtration test in a Baroid HTHP filter press. It is clear that the novel copolymers allow very good water loss reduction to be achieved at low temperatures. Naturally, the polymers based on partially hydrolyzed acrylamide-AMPS (=acrylic acid-acrylamide-AMPS copolymer) claimed in U.S. Pat. No. 4,015,991 and prepared in Comparative Examples 2 and 3 also reduce water loss at these low temperatures. However, Table 1 clearly shows the adverse effect on the setting time. Comparative example 1 confirms the situation found in U.S. Pat. No. 4,015,991 that partial hydrolysis of acrylamide-co-AMPS polymers is necessary in the aqueous polymerization process in order to be able to keep the water loss of cement slurries in adequate, practically acceptable limits (<100 ml/30 min) at low temperatures.

The novel polymers have no effect on the setting time of the cement slurries so long as the acrylamide has not subsequently been partially hydrolyzed as described in U.S. Pat. No. 4,015,991. Example 5 and Example 6 describe novel copolymers which have subsequently been partially hydrolyzed. The partial hydrolysis immediately has an adverse effect in an undesired extension of the setting time. Example 7 makes it clear that partial hydrolysis of the acrylamide does not occur under the above polymerization conditions. Examples 8 and 9 show the effect of the preferred molecular weight range (k value).

| Formulation of the cement slurries: | 15.8 ppg of Dyckerhoff G |
| | 0.3% bwoc of polymer |
| | 0.065 gal/sk of PNS |
| | 0.05 gal/sk of antifoaming agent |

TABLE 1

| Copolymer | k value | Conc. [% bwoc] | Temp. [° C.] | Yield point [lb/100 ft²] | Plast. viscosity [cp] | Water loss [ml/30 min] | Setting time 100 BC [h:min] |
| --- | --- | --- | --- | --- | --- | --- | --- |
| Example 1 | 212 | 0.3 | 35 | 6 | 75 | 40 | 4:30 |
| Example 2 | 207 | 0.3 | 35 | 4 | 90 | 55 | 4:20 |
| Example 3 | 210 | 0.3 | 35 | 10 | 92 | 45 | 4:40 |
| Example 4 | 205 | 0.3 | 35 | 7 | 83 | 35 | 4:15 |
| Example 5 | 212 | 0.3 | 35 | 9 | 95 | 35 | 5:45 |
| Example 6 | 212 | 0.3 | 35 | 11 | 99 | 32 | 5:30 |
| Example 7 | 212 | 0.3 | 35 | 7 | 73 | 39 | 4:32 |
| Example 8 | 169 | 0.3 | 35 | 3 | 65 | 120 | 4:30 |
| Example 9 | 148 | 0.3 | 35 | 2 | 60 | 220 | 4:20 |
| Comparative Example 1 | 212 | 0.3 | 35 | 5 | 75 | 520 | 4:00 |
| Comparative Example 2 | 212 | 0.3 | 35 | 6 | 70 | 120 | 6:30 |
| Comparative Example 3 | 212 | 0.3 | 35 | 8 | 77 | 140 | 6:20 |

% bwoc Concentration by weight of cement
BC Bearden units of consistency

The yield point, plastic viscosity and water loss relate to conditioned cement slurry at 35° C.

Table 2 shows the water-loss-reducing properties of the above examples according to API spec. 10 at 176° C. (350° F.) in the stirring fluid loss test apparatus. It is clear here that the novel copolymers allow very good water loss reduction to be achieved even at high temperatures. At these high temperatures, the polymers claimed in U.S. Pat. No. 4,015,991 based on partially hydrolyzed acrylamide-AMPS(= acrylic acid-acrylamide-AMPS copolymer) no longer reduce water loss in an adequate, i.e. economical, manner (Comparative Example 1, 2 and 3).

| Formulation of the cement slurries: | 15.8 ppg Dyckerhoff G |
| | 0.7% bwoc of polymer |
| | 0.20 gal/sk of PNS |
| | 1.5 gal/sk of HT retarder |
| | 35% bwoc of silica flour |
| | 0.05 gal/sk of antifoaming agent |

TABLE 2

| Copolymer | k value | Conc. [% bwoc] | Temperature [° C.] | Yield point [lb/100 ft²] | Plast. viscosity [cp] | Water loss [ml/30 min] |
|---|---|---|---|---|---|---|
| Example 1 | 212 | 0.7 | 176 | 3 | 89 | 38 |
| Example 2 | 207 | 0.7 | 176 | 2 | 100 | 55 |
| Example 3 | 210 | 0.7 | 176 | 5 | 110 | 35 |
| Example 4 | 205 | 0.7 | 176 | 7 | 93 | 35 |
| Example 5 | 212 | 0.7 | 176 | 2 | 83 | 100 |
| Example 6 | 212 | 0.7 | 176 | 9 | 105 | 90 |
| Example 7 | 212 | 0.7 | 176 | 4 | 85 | 36 |
| Example 8 | 169 | 0.7 | 176 | 4 | 60 | 250 |
| Example 9 | 148 | 0.7 | 176 | 1 | 55 | 370 |
| Comparative Example 1 | 207 | 0.7 | 176 | 5 | 75 | 760 |
| Comparative Example 2 | 207 | 0.7 | 176 | 7 | 140 | 660 |
| Comparative Example 3 | 207 | 0.7 | 176 | 12 | 130 | 870 |

% bwoc Concentration by weight of cement
BC Bearden units of consistency person skilled in the art, according to API spec. 10, and, in addition to the water-loss-reducing polymers, contain further additives customary to the person skilled in the art which are used as standard for producing an optimum cement slurry. The following abbreviations are used:

| | |
|---|---|
| % bwoc | Concentration by weight of cement |
| ppg | Density of the cement slurries in pounds per gallon = 0.1198 kg/l |
| gal/sk | Concentration in gallons per sack, i.e. 1 gallon (= 3.785 liters) of liquid additive per sack of cement (corresponds to 8.879 l/100 kg of cement) |
| PNS | Polynaphthalene sulfonate |
| PMS | Polymelamine sulfonate |

TABLE 3

| Temp. | 39° F. | 28° C. 80° F. | 28° C. 80° F. | 28° C. 80° F. | 38° C. 100° F. | 71° C. 160° F. | 93° C. 200° F. | 93° C. 200° F. | 121° C. 250° F. | 149° C. 300° F. | 176° C. 350° F. | 176° C. 350° F. | 205° C. 400° F. |
|---|---|---|---|---|---|---|---|---|---|---|---|---|---|
| Cement | G | H | H | G | Raysut | H | H | Saudi | H | H | H | G | H |
| Density [ppg] | 12 | 13 | 16.2 | 15.8 | 15.8 | 13 | 16.2 | 15.8 | 16.2 | 16.2 | 18.5 | 15.8 | 16.2 |
| [kg/l] | | 1.56 | 1.94 | 189 | 1.89 | 1.56 | 1.94 | 1.89 | 1.94 | 1.94 | 2.22 | 1.89 | 1.94 |
| Mixing water | Fresh water | Fresh water | Fresh water | Fresh water | Salt | Sea | Fresh water | Fresh water | Fresh water | Fresh water | Fresh water | Fresh water | Fresh water |
| Copolymer, % bwoc | 0.27 | 0.50 | 0.30 | 0.30 | 0.17 | 0.70 | 0.40 | 0.35 | 0.40 | 0.50 | 0.55 | 0.60 | 0.70 |
| PNS, % bwoc | 0.26 | — | 0.65 | 0.45 | 0.80 | — | 0.50 | 0.70 | 0.5 | 0.40 | 0.40 | 0.25 | 0.90 |
| PMS, gal/sk | — | 0.40 | — | — | — | 0.35 | — | — | — | — | — | — | — |
| CaCl₂, % bwoc | 1.36 | | | 0.75 | | | | | | | | | |
| Bentonite, % bwoc | 35.7 Extender | 2.0 | — | — | — | — | — | — | — | — | — | — | — |
| Lignosulfonate, % bwoc | — | — | — | — | — | — | 0.22 | 0.25 | — | — | — | — | — |
| Na silicate, gal/sk | — | — | — | — | — | 0.45 | — | — | — | — | — | — | — |
| Synth. retardant, gal/sk | — | — | — | — | — | — | — | — | — | 0.75 | — | 1.0 | 0.90 |
| Lignin derivative, % bwoc | — | — | — | — | — | — | — | — | 0.20 | — | 1.2 | — | — |
| Silica % bwoc | — | — | — | — | — | — | — | — | 35 | 35 | 35 | 35 | 35 |
| Antifoam, gal/sk | 0.05 | 0.05 | 0.05 | 0.05 | 0.05 | 0.05 | 0.05 | 0.05 | 0.05 | 0.05 | 0.05 | 0.05 | 0.05 |
| Rheology of the cond. cement slurries | | | | | | | | | | | | | |
| Yield point, (lb/100 ft²) | 51 | 12 | 26 | 6 | 5 | 16 | 6 | 12 | 7 | 11 | 9 | 8 | 9 |
| Plast. viscosity (cP) | 279 | 22 | 99 | 75 | 39 | 31 | 87 | 70 | 119 | 99 | 133 | 89 | 85 |
| Water loss(ml) | 55 | 64 | 56 | 44 | 101 | 108 | 58 | 44 | 66 | 44 | 52 | 56 | 40 |

The yield point and plastic viscosity relate to conditioned cement slurry at 93° C. (200° F.).

The water loss was determined at 176° C. (350° F.).

Table 3 shows the water-loss-reducing properties of the novel polymers over a broad temperature range (4° C. to 205° C.) in cement slurries of various density, salinity and based on cement qualities of different origin. The universal applicability of the novel polymers represents an important contribution toward simplifying the cement slurry formulations employed worldwide. The cement slurries were prepared and tested by a standardized method known to the The experimental results given in Table 4 show that the novel copolymer has very good water-loss-reducing properties as an additive to conventional water-based drilling fluids, even at a high temperature of 375° F. =190° C.

TABLE 4

| | |
|---|---|
| Density | 1.9 kg/l |
| Water | Fresh water |
| Copolymer | 0.56% by wt. |

TABLE 4-continued

| | |
|---|---|
| Bentonite (30 ppb) prehyd. | 1.12% by wt. |
| Clay stabilizer | 2.24% by wt. |
| Ligninsulfonate | 2.52% by wt. |
| Sulfonated synthetic polymer | 1.4% by wt. |
| Monoethanolamine | 0.21% by wt. |
| Potassium hydroxide | pH = 10 |
| Lignosulfonate | 0.35% by wt. |
| Clay | 7% by wt. |
| Barytes | up to 1.9 kg/l |
| Rheology after heat ageing in a roller oven (16 h at 375° F.): | |
| Yield point (lb/100 ft$^2$) | 23 |
| Plastic viscosity (cP) | 34 |
| 10 min. gel strength | 40 |
| HTHP water loss (375° F./1500 psi) | 53 ml |

What is claimed is:

1. A copolymer consisting of
(a) 1–99% by weight of structural units of the formula (1)

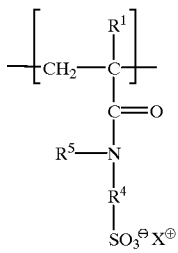

(1)

where $R^1$ is hydrogen or methyl, $R^4$ is $C_1$–$C_{22}$-alkylene, $R^5$ is $C_1$–$C_{22}$-alkyl or hydrogen, and X is ammonium, lithium, sodium, potassium, an amine or a mixture of these substances, and (b) 99–1% by weight of structural units of the formula (2)

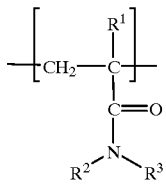

(2)

where $R^1$ is hydrogen or methyl, $R^2$ and $R^3$, independently of one another, are hydrogen, or $C_2$–$C_{22}$-alkyl, wherein component b) is not hydrolyzed and the copolymers have been prepared by a solution precipitation polymerization in a nonaqueous solvent or a water-miscible, organic solvent having a low water content which is a precipitant for the copolymer.

2. A copolymer as claimed in claim 1, having a molecular weight of from 10,000 to 10,000,000.

3. A copolymer as claimed in claim 1, which consists of
   (a) 90–10% by weight of units of the formula (1) and
   (b) 10–90% by weight of units of the formula (2).

4. A copolymer as claimed in claim 3, which consists of
   (a) 30–70% by weight of units of the formula (1) and
   (b) 70–30% by weight of units of the formula (2).

5. A copolymer as claimed in claim 1, where the radicals in the formula (1) and the formula (2) have the following meanings, independently of one another:
   $X^+=NH_4^+$ or $Na^+$,
   $R^1=H$, $R^5=H$ and $R^4=$—$C(CH_3)_2$—$CH_2$—,
   $R^1=CH_3$, $R^5=H$ and $R^4=$—$C(CH_3)_2$—$CH_2$—,
   $R^1$, $R^2$ and $R^3=H$,
   $R^1$ and $R^2=H$, $R^3=$—$C(CH_3)_3$,
   $R^1=CH_3$, $R^2$ and $R^3=H$, or
   $R^1$ and $R^2=H$, $R^3=$—$C(CH_3)_3$.

6. A copolymer as claimed in claim 1, having a k value of from 100 to 300 measured in 0.5% by weight solution in distilled water.

7. A process for cementing subterranean wells using a cement slurry comprising the following components:
   a) water of various salinity
   b) cement
   c) a copolymer as claimed in claim 1 in a concentration of 0.01–5% bwoc.

8. The process as claimed in claim 7 wherein said cement slurry further comprises at least one auxiliary additive selected from the group consisting of dispersants, retardants, accelerators, extenders, antifoams and silicate derivatives.

9. A process for drilling a subterranean borehole for recovering oil comprising adding a drilling fluid in said borehole, said drilling fluid comprising an aqueous solution of the copolymer as claimed in claim 1 and optionally additives selected from the group consisting of bentonites, clay stabilizers, lignin/lignosulfates, pH stabilizers, heat stabilizers and barytes.

10. The copolymer of claim 2, wherein said copolymer has a molecular weight of from 500,000 to 5,000,000.

11. The copolymer of claim 10, wherein said copolymer has a molecular weight of from 1,000,000 to 4,000,000.

12. The copolymer of claim 6 having a k value of from 150 to 270.

13. The copolymer of claim 12 having a k value of from 180 to 250.

14. The process of claim 7 wherein said copolymer in c) is present at a concentration of from 0.05 to 0.9% bwoc.

* * * * *